United States Patent
Maekawa

(10) Patent No.: US 8,120,296 B2
(45) Date of Patent: Feb. 21, 2012

(54) MOTOR MAGNETIC POLE POSITION DETECTING DEVICE

(75) Inventor: Sari Maekawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 290 days.

(21) Appl. No.: 12/574,239

(22) Filed: Oct. 6, 2009

(65) Prior Publication Data

US 2010/0090632 A1 Apr. 15, 2010

(30) Foreign Application Priority Data

Oct. 9, 2008 (JP) ................................. 2008-262793

(51) Int. Cl.
- *H02P 21/00* (2006.01)
- *H02P 27/00* (2006.01)
- *G05B 11/28* (2006.01)

(52) U.S. Cl. .................. 318/400.02; 318/599; 318/700; 318/719; 318/723; 318/727; 318/807

(58) Field of Classification Search ............ 318/400.02, 318/599, 700, 719, 723, 727, 807
See application file for complete search history.

(56) References Cited

U.S. PATENT DOCUMENTS

| | | | | |
|---|---|---|---|---|
| 6,081,093 A * | 6/2000 | Oguro et al. | ................... | 318/807 |
| 7,045,988 B2 * | 5/2006 | Ha et al. | ........................ | 318/807 |
| 7,348,749 B2 * | 3/2008 | Ide et al. | ....................... | 318/599 |
| 7,482,777 B2 * | 1/2009 | Tomigashi | ..................... | 318/807 |
| 7,528,568 B2 * | 5/2009 | Tobari et al. | .................. | 318/723 |
| 2004/0007995 A1 * | 1/2004 | Fu | ................................ | 318/254 |
| 2004/0051495 A1 * | 3/2004 | Kaneko et al. | ................ | 318/807 |
| 2004/0232862 A1 * | 11/2004 | Wogari et al. | ................. | 318/254 |
| 2007/0069682 A1 * | 3/2007 | Ide et al. | ....................... | 318/719 |

FOREIGN PATENT DOCUMENTS

| | | |
|---|---|---|
| JP | 11-123000 A | 4/1999 |
| JP | 2000-102300 A | 4/2000 |
| JP | 2001-136779 A | 5/2001 |
| JP | 2001-339999 | 12/2001 |
| JP | 2004-112898 A | 4/2004 |
| JP | 2004-312864 A | 11/2004 |

OTHER PUBLICATIONS

Japanese Office Action issued Feb. 15, 2011, in Patent Application No. 2008-262793 with English Translation.

* cited by examiner

*Primary Examiner* — Walter Benson
*Assistant Examiner* — Gabriel Agared
(74) *Attorney, Agent, or Firm* — Oblon, Spivak, McClelland, Maier & Neustadt, L.L.P.

(57) ABSTRACT

A motor magnetic pole position detecting device includes a detection current command generation unit generating a detection AC current command, a current detection section detecting a current flowing into the motor, a coordinate conversion unit vector-converting the current detected by the current detection section into an excitation component and a torque component both represented by a d-q orthogonal coordinate system based on a phase angle obtained at any rotational frequency, a current control unit delivering a voltage command to current-control the motor based on the detection current command and the current converted by the coordinate conversion unit, an inductance calculation unit calculating motor inductance based on the voltage command and the current converted by the coordinate conversion unit, and a magnetic pole position detection section calculating a frequency and phase of the inductance calculated by the inductance calculation unit, converting the inductance phase into a motor magnetic pole position.

14 Claims, 14 Drawing Sheets

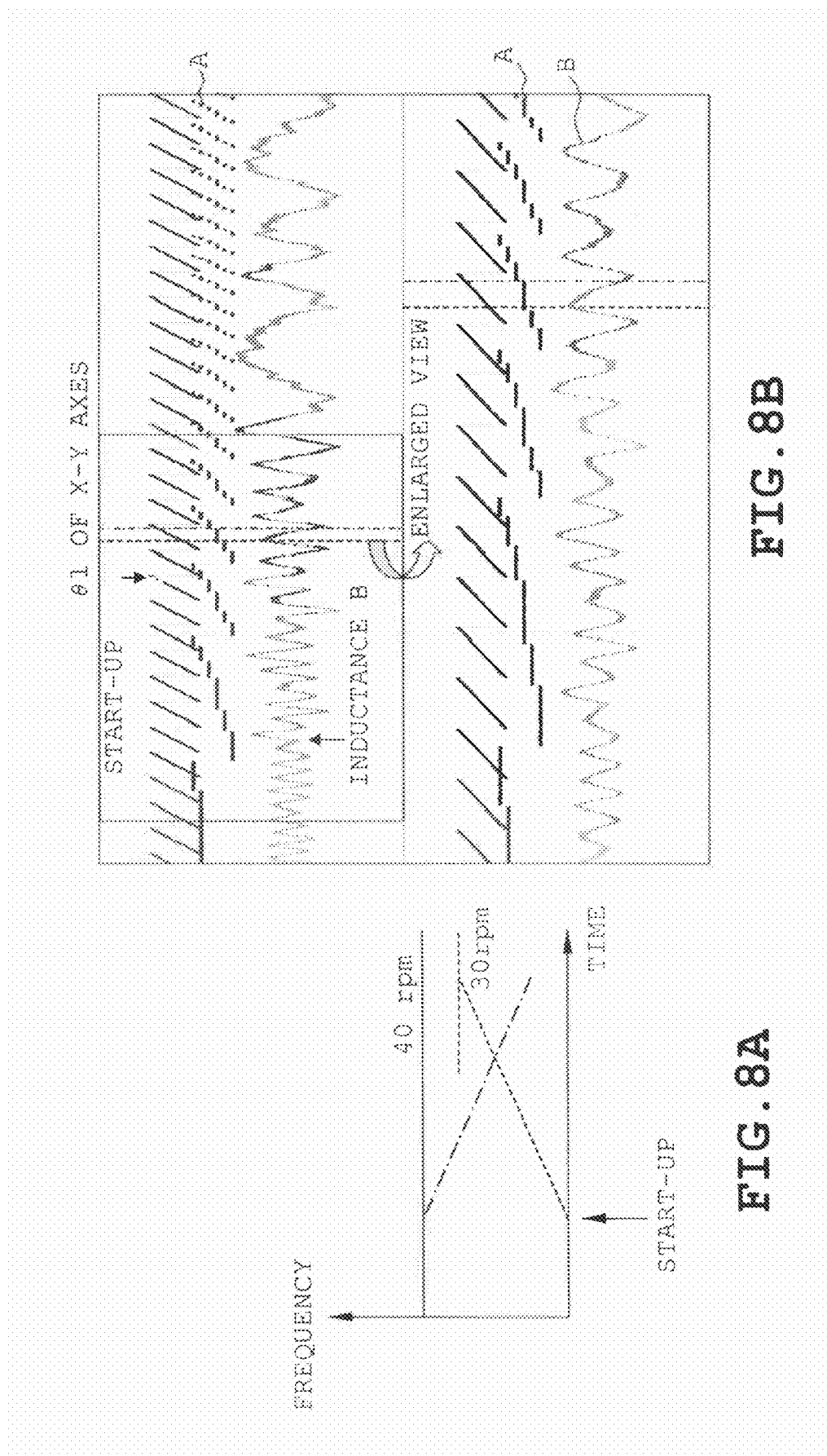

MOTOR MAGNETIC POLE POSITION DETECTING DEVICE

CROSS-REFERENCE TO RELATED APPLICATIONS

This application is based on and claims the benefit of priority from the prior Japanese Patent Application No. 2008-262793, filed on Oct. 9, 2008, the entire contents of which are incorporated herein by reference.

BACKGROUND

1. Field

The present invention relates to a device which detects a magnetic pole position of a permanent magnet motor having a magnetic saliency.

2. Related Art

Recent washing machines and the like have employed an arrangement of vector control for a permanent magnet motor for the purpose of improving a precision in rotational control or washing performance. As a result, power consumption and an amount of vibration produced during the operation have been reduced in the washing machines and the like. Electrical current is controlled according to a position of magnetic pole of a permanent magnet motor when the vector control is applied to the motor for control in high precision and high rotational speed. In this case, a position sensor is necessitated for this control manner. However, addition of a position sensor results in a problem of increasing production costs, a problem that an arrangement space needs to be ensured for the position sensor, and a problem of increase in the wiring for connecting between the position sensor and a control device. Furthermore, there arises a problem of reduction in the reliability due to possible occurrence of breaking or disconnection or a problem of maintenance.

In view of the above-described problems, there has been provided a sensorless drive system in which an induced voltage in a permanent magnet is detected and a magnetic pole position using the relationship between the induced voltage and a magnetic pole position but without any position sensor. However, there is a problem that the position detection cannot be executed in a stopped state where no induced voltage is generated or in a very low speed range in which voltage amplitude is too small.

On the other hand, there is a system that executes a detection of magnetic pole position using a magnetic saliency regarding an embedded permanent magnet having a magnetic saliency or a reluctance motor. Since inductance is distributed according to a magnetic pole position in these motors, a high-frequency current or voltage is applied to the motor so that a motor current and voltage are detected. Inductance is then obtained from the applied high-frequency current or voltage, so that a magnetic pole position is obtained (see Japanese patent application publication JP-A-2001-339999).

However, the inductance distribution of each aforesaid motor appears according to the magnetic salience. Accordingly, a clear distribution is obtained from a motor having a larger salience ratio (Lq/Ld) but in the motor having a smaller salience ratio, an inductance distribution is buried in an electrical or mechanical error of the motor or calculating error in a calculating unit, whereupon there is a problem that the position detection becomes difficult. Furthermore, the motor causes magnetic saturation when a relatively larger current is supplied to the motor. Even when a q-axis inductance Lq is saturated, the salience ratio becomes smaller as compared with the case where no power is supplied to the motor. As a result, too, the position detection becomes difficult.

SUMMARY

Therefore, an object of the present invention is to provide a motor magnetic pole position detecting device which can perform the positional detection successfully even when the motor has a small salience ratio or magnetic saturation occurs in the motor.

According to one aspect of the present invention, there is provided a motor magnetic pole position detecting device which detects a magnetic pole position of a permanent magnet motor having a magnetic saliency, the device comprising a detection current command generation unit which generates a detection AC current command for detection of the magnetic pole position; a current detection section which detects a current flowing into the motor; a coordinate conversion unit which vector-converts the current detected by the current detection section into an excitation component and a torque component both represented by a d-q orthogonal coordinate system based on a phase angle obtained at any rotational frequency; a current control unit which generates and delivers a voltage command to current-control the motor based on the detection current command and the current converted by the coordinate conversion unit; an inductance calculation unit which calculates an inductance of the motor based on the voltage command and the current converted by the coordinate conversion unit; and a magnetic pole position detection section which calculates a frequency and phase of the inductance calculated by the inductance calculation unit, thereby converting the phase of the inductance into a magnetic pole position of the motor.

According to another aspect of the invention, there is provided a motor magnetic pole position detecting device which detects a magnetic pole position of a permanent magnet motor having a magnetic saliency, the device comprising a detection voltage command generation unit which generates a detection AC voltage command for detection of the magnetic pole position; a current detection section which detects a current flowing into the motor; a coordinate conversion unit which vector-converts the current detected by the current detection section into an excitation component and a torque component both represented by a d-q orthogonal coordinate system based on a phase angle obtained at any rotational frequency; an inductance calculation unit which calculates an inductance of the motor based on the voltage command and the current converted by the coordinate conversion unit; and a magnetic pole position detection section which calculates a frequency and phase of the inductance calculated by the inductance calculation unit, thereby converting the phase of the inductance into a magnetic pole position of the motor.

According to each above-described arrangement, when the detection AC current or voltage command is generated, a temporal change in the inductance obtained by the inductance calculation unit has a frequency component of a difference between a rotational frequency of the motor and any rotational frequency determining a phase angle supplied to the coordinate conversion unit. Furthermore, since the inductance of the motor having the magnetic saliency contains information about a motor magnetic pole position, the magnetic pole position detection section carries out an operation to obtain a frequency and phase of the inductance, so that the magnetic pole position of the motor can be obtained. Accordingly, the magnetic pole position can reliably be detected even when the motor has a relatively smaller salience ratio or the motor is in a magnetically saturated state.

BRIEF DESCRIPTION OF THE DRAWINGS

In the accompanying drawings:

FIGS. 8A and 8B are similar to FIGS. 7A and 7B respectively, showing the case where the observation axis is rotated at a constant frequency;

DETAILED DESCRIPTION

Figure 1:
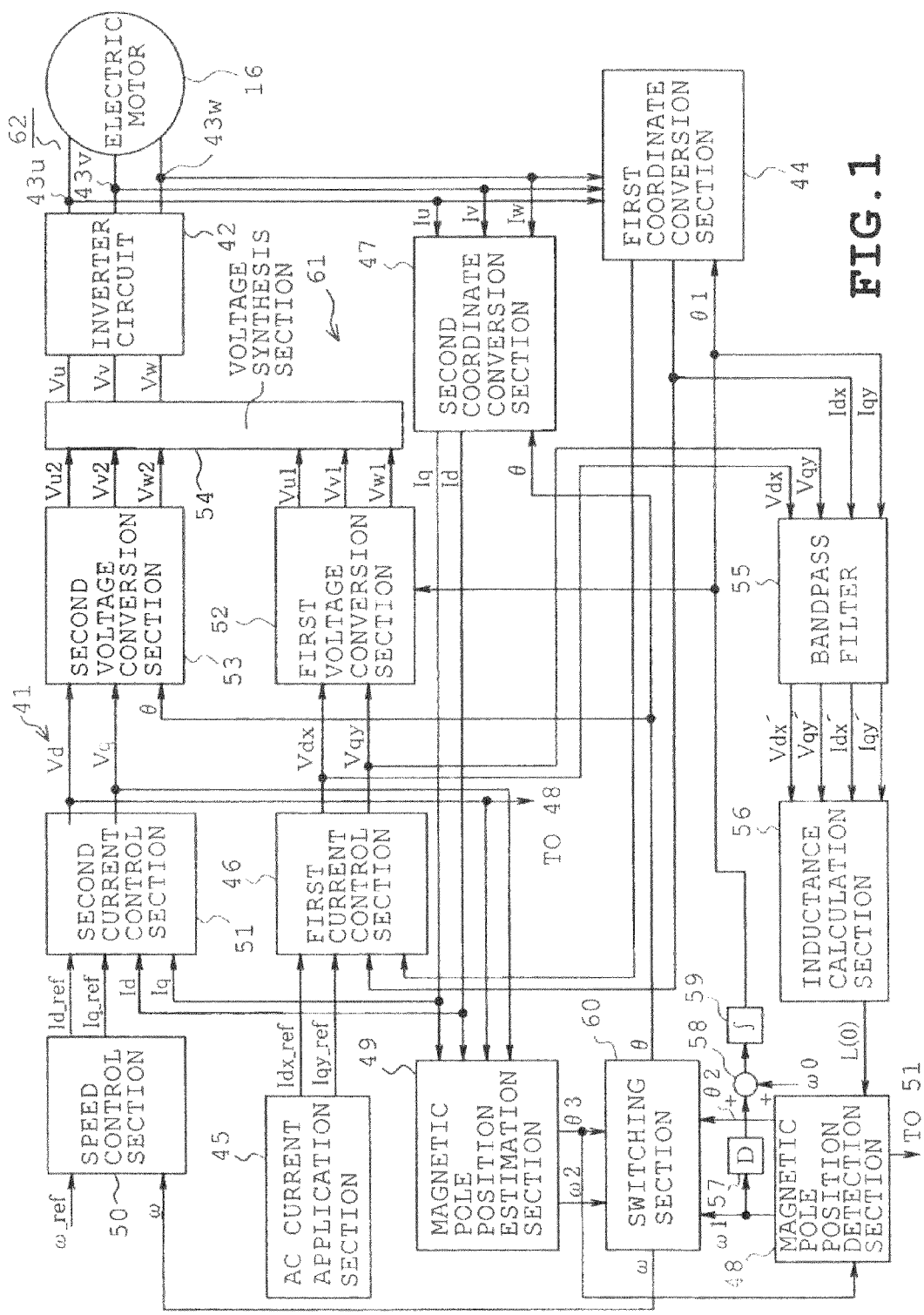
FIG. 1 is a functional block diagram showing an electrical arrangement of a control device vector-controlling an electric motor in which the motor magnetic pole position detecting device in accordance with a first embodiment of the present invention is incorporated.

A first embodiment of the present invention will be described with reference to FIGS. 1 to 13. Referring first to FIG. 12, an embedded permanent magnet motor (interior permanent magnet (IPM) motor) is shown. The permanent magnet motor comprises a stator 1 and a rotor 10. The stator 1 includes a stator core 3 having a number of radially arranged teeth 2, resin 4 that is molded so as to cover the stator core 3, and a stator winding 5 wound on the teeth 2. The stator core 3 is formed by stacking a plurality of steel sheets. The stator 1 is provided with a mounting portion 6 which is to be mounted on a predetermined portion of a washing machine.

The stator 1 includes a generally vessel-shaped frame 11 made of a magnetic material, an annular rotor core 12 disposed on an inner circumference of an annular wall 11a formed at the open side of the frame 11, a number of field system permanent magnets 14 (neodymium magnets, for example), and a molding resin 15 molded so that the rotor core 12, permanent magnets 14 and the frame 11 are integrated with one another. The stator core 12 is disposed so that an inner circumferential surface thereof is opposed to distal ends of the teeth 2 of the stator core 3 with a predetermined air gap therebetween, whereupon an outer rotor type permanent magnet motor 16 is constructed. The motor 16 thus constructed as described above has a slight magnetic saliency due to the structure of the rotor 10.

Figure 13:
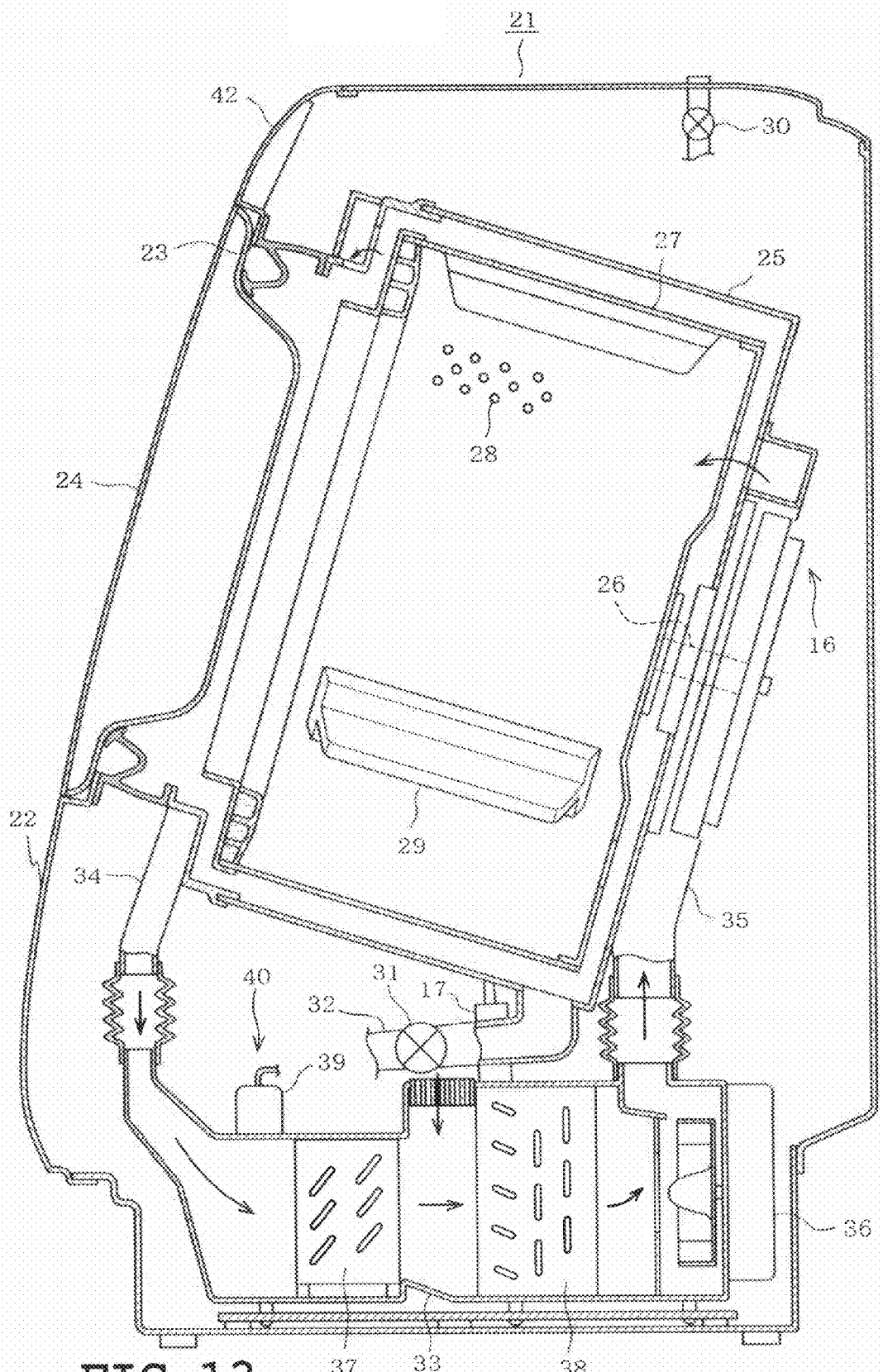
FIG. 13 is a longitudinal side section of a drum washing machine.

Referring now to FIG. 13, a drum washing-drying machine 21 is shown. The drum washing-drying machine 21 comprises an outer casing 22 forming an outer envelope of the drum washing-drying machine 21 and having a circular laundry access opening 23 formed in a front thereof. The access opening 23 is opened and closed by a door 24. A bottomed cylindrical water tub 25 having a closed rear is disposed in the outer casing 22. The stator 1 of the permanent magnet motor 16 serving as a washing motor is secured to a central rear of the water tub 25 by screws (not shown). The water tub 25 is supported by a suspension 17.

The permanent magnet motor 16 has a rotational shaft 26 having a rear end (a right end as viewed in FIG. 13) fixed to the rotor 10 of the permanent magnet motor 16 and a rear end (a left end as viewed in FIG. 13) protruding into the water tub 25. A bottomed cylindrical drum 27 having a closed rear is fixed to the front end of the rotational shaft 26 so as to be coaxial with the water tub 25. The drum 27 is rotated together with the rotational shaft 26 by the drive of the permanent magnet motor 16. The drum 27 is provided with a plurality of flow holes 28 through which air or water flows and a plurality of baffles 29 which scrape and unravel laundry in the drum 27. A water-supply valve 30 is connected to the water tub 25. When the water-supply valve 30 is opened, water is supplied into the water tub 25. Furthermore, a drain hose 32 provided with a drain valve 31 is connected to the water tub 25. When the drain valve 32 is opened, water is discharged out of the water tub 25.

An air flow duct 33 is provided below the water tub 25 so as to extend in the front-back direction. The air flow duct 33 has a front end connected through a front duct 34 to the water tub 25 and a rear end connected through a rear duct 35 to the water tub 25. A blower fan 36 is provided on the rear end of the air flow duct 33. Air in the water tub 25 is caused to flow from the front duct 34 into the air flow duct 33 and to return through the rear duct 35 into the water tub 25 by the blowing action of the blower fan 36, as shown by arrows in FIG. 13.

An evaporator 37 is disposed at the front end side in the air flow duct 33, and a condenser 38 is disposed at the rear end side in the air flow duct 33. The evaporator 37 and the condenser 38 constitute a heat pump 40 together with a compressor 39 and a throttle valve (not shown), so that air flowing through the air flow duct 33 is dehumidified by the evaporator 37 and heated by the condenser 38 and then recirculated through the water tub 25.

Referring now to FIG. 1, an electrical arrangement of a motor control device 41 vector-controlling the motor 16 is shown by means of functional blocks. The functional blocks except an inverter circuit (a drive unit) 42 are realized by software processes executed by a microcomputer. The microcomputer is provided with an input/output (I/O) port, serial communication circuit, analog-to-digital (A/D) converter for input of analog signals such as a current detection signal, timer for pulse width modulation (PWM) process and the like although these are not shown.

Motor current detecting sections (current detection sections) 43u, 43v and 43w are current detection sections provided on an output line of an inverter circuit 42, detecting phase U, V and W currents Iu, Iv and Iw. Current detection signals generated by the motor current detecting sections 43u, 43v and 43w are supplied to an A/D converter (not shown) in the motor control device 41 to be converted to corresponding digital data. A first coordinate conversion section (first coordinate conversion unit) 44 converts three-phase currents Iu, Iv and Iw to two-phase currents Iα and Iβ. The first coordinate conversion section 44 is adapted to further convert currents Iα and Iβ of coordinate system at rest to currents Idx and Iqy of a rotating coordinate system (X-Y coordinate system) based on a rotating phase angle θ1 ordered from the side of a magnetic pole position detection section 48 as will be described later.

An alternating current application section (a detecting current command generation unit) 45 delivers, as current commands (detecting current commands) Idx_ref and Igy_ref, current with a sufficiently higher frequency (about several hundreds Hz, for example) than an operating frequency of the motor 16 to a first current control section (a first current control unit) 46 serving as a current controller of the X-Y coordinate system. These current commands Idx_ref and Iqy_ref are sinusoidal currents having respective phases differing from each other by 90 degrees along the x-axis and the y-axis and the same amplitude (about 1/10 of the motor rated current, for example). The first current control section 46 controls Idx and Iqy converted by the first coordinate conversion section 44, based on the current commands Idx_ref and Iqy_ref delivered by the alternating current application section 45, thereby delivering voltage commands Vdx and Vqy.

A second coordinate conversion section (a second coordinate conversion unit) 47 converts the three-phase currents Iu, Iv and Iw to two-phase currents Iα and Iβ. The second coordinate conversion section 47 further converts the currents Iα and Iβ of coordinate system at rest to currents Id and Iq of rotating coordinate system (d-q coordinate system) based on the magnetic pole position θ2 obtained by a magnetic pole position detection section (a magnetic pole position detection section, a frequency detection section) 48 or a magnetic pole position θ3 obtained by a magnetic pole position estimation section (a magnetic pole position estimation unit) 49. A speed control section (a speed control unit) 50 obtains d-axis and q-axis current commands Id_ref and Iq_ref so that a motor speed ω supplied via a switching section 60 which will be described later to the speed control section 50 follows a speed control command ω_ref, based on the speed control command ω_ref ordered by a higher-order system.

A second current control section (a second current control unit) 51 controls the currents Id and Iq converted by the second coordinate conversion section 47 based on the d-axis and q-axis current commands Id_ref and Iq_ref delivered by the speed control section 50. A first voltage conversion section (a first voltage conversion unit) 52 converts voltage commands Vdx and Vqy of X-Y conversion system to voltage commands Vu1, Vv1 and Vw1 based on the aforesaid phase angle θ1. A second voltage conversion section (a second voltage conversion unit) 53 converts the voltage commands Vd and Vq of the d-axis and q-axis conversion system to voltage commands Vu2, Vv2 and Vw2 based on a magnetic pole position θ supplied via the switching section 60 to the second voltage conversion section 53.

A voltage synthesis section (a voltage command synthesis unit) 54 adds the voltage commands Vu1, Vv1 and Vw1 delivered by the first voltage conversion section 52 and the voltage commands Vu2, Vv2 and Vw2 delivered by the second voltage conversion section 53 thereby to obtain voltage commands Vu, Vv and Vw. The voltage synthesis section 54 generates PWM signals Vup, Vun, Vvp, Vvn, Vwp and Vwn based on the obtained voltage commands Vu, Vv and Vw, delivering the PWM signals Vup, Vun, Vvp, Vvn, Vwp and Vwn to the inverter circuit 42. The inverter circuit 42 comprises six insulated gate bipolar transistors (IGBTs) (semiconductor switching elements) connected into a three-phase full-bridge configuration, for example, although the IGBTs are not shown.

A band-pass filter 55 has a passband set so that a frequency component of AC current applied by an AC current application section 45 is extracted from X-Y coordinate system currents Idx and Iqy and the voltage commands Vdx and Vqy delivered by the first current control section 46. An inductance calculation section (an inductance calculation unit) 56 calculates an inductance value or a value having the same tendency as an angular distribution of inductance from frequency components of AC currents Idx', Iqy', Vdx' and Vqy' delivered by the bandpass filter 55. For example, a value H is obtained from the aforesaid AC currents Idx', Iqy', Vdx' and Vqy' by the following equation (0):

$$H = Vqy' \times Iqy' - Vdx' \times Idx' \qquad (0)$$

The obtained value H is supplied to a bandpass filter (not shown) in the inductance calculation section 56 so that a frequency component which is twice as high as a current command frequency is eliminated from the value H. Thereafter, an inductance L is obtained when only a DC (direct current) component is extracted.

A magnetic pole position detection section 48 extracts a frequency component and a phase component of the inductance obtained by the inductance calculation section 16. Since the extracted phase component θL1 corresponds to the frequency that is twice as high as a magnetic pole position of the motor 16, the phase component θL1 is converted to a phase component θL2 having one half of the frequency. The magnetic pole position θ2 of the motor 16 is calculated by adding θ1 to the phase component θL2, and a rotating frequency ω1 of the motor 16 is calculated from a differential value of the magnetic pole position θ2. Furthermore, the aforesaid rotational frequency ω1 is delayed by a delay device 57 such that the rotational frequency ω1 becomes equal to a frequency ω1 (1) obtained before one control cycle. A predetermined frequency ω0 is added to the frequency ω1 (1) by an adder 58. An integrator 59 integrates a result of addition, frequency [ω1 (1)+ω0] thereby to obtain a phase angle θ1, which is then supplied to the first coordinate conversion section 44 and the first voltage conversion section 52.

The magnetic pole position estimation section 49 estimates a motor speed ω2 using the d-axis motor voltage equation (1). Furthermore, the magnetic pole position estimation section 49 calculates a magnetic pole position θ3 by integrating the motor speed ω2:

$$Vd = R \cdot Id - \omega \cdot Lq \cdot Iq \qquad (1)$$

A switching section 60 selects and delivers the detection value θ2 of the magnetic pole position detection section 48 or the estimated value θ3 of the magnetic pole position estimation section 49 as the motor frequency ω and the magnetic pole position θ both used in the speed control section 50, the second coordinate conversion section 47 and the second voltage conversion section 53.

The above-described arrangement except for the motor 16 constitutes the motor control device 41. The motor control device 41 except for the inverter circuit 42 constitutes the motor magnetic pole position detecting device 61. Additionally, a motor drive system 62 comprises the motor control device 41 and the motor 16.

Figures 2A, 2B:
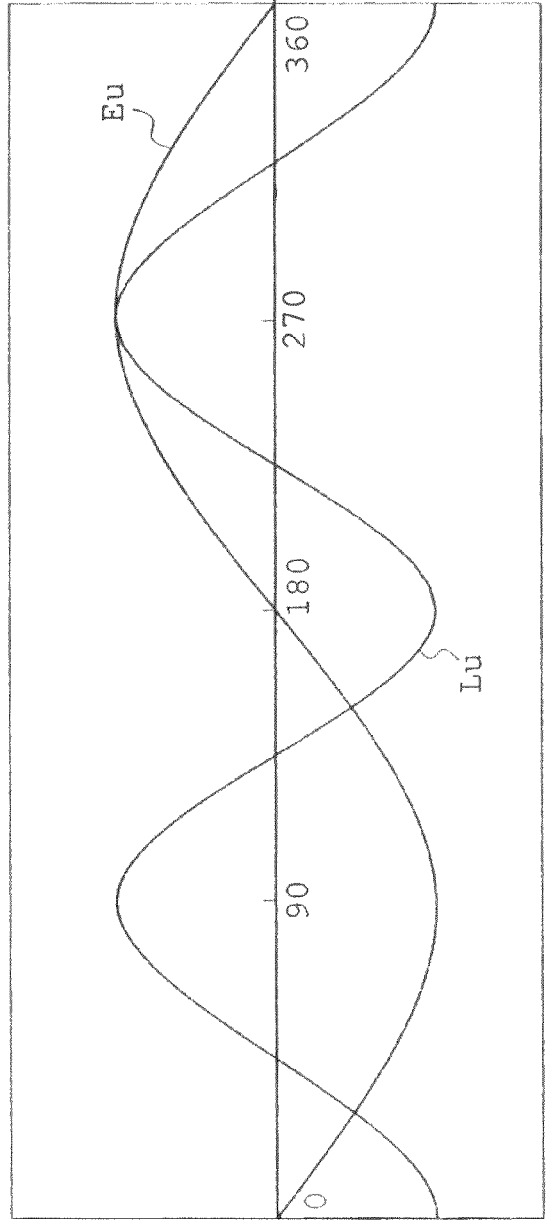
FIGS. 2A and 2B show a voltage equation of the permanent magnet motor, inductance Lu and induced voltage Eu.

The working of the motor magnetic pole position detecting device will now be described with reference to FIGS. 2 to 11 as well as to FIG. 1. Firstly, the principle of the magnetic pole position detection will be described. Referring to FIGS. 2A and 2B, the voltage equation of the permanent magnet motor and equations of the phase U inductance Lu and phase U induced voltage Eu are shown. In FIG. 2A, reference symbol "Ra" designates a winding resistance, reference symbol "M" designates an interphase mutual inductance, reference symbol "p" designates a differential operator, reference symbol "la" designates a leakage inductance per phase, and reference symbol "La" designates a mean value of effective inductance per phase. Furthermore, reference symbol "Las" designates an amplitude of effective inductance per phase and is proportional to a salience ratio (Lq/Ld).

An induced voltage generated during rotation of the motor changes at the same frequency as at the motor magnetic pole position and has an amplitude that is proportional to the rotational speed of the motor. On the other hand, the motor winding inductance changes at a frequency twice as high as the frequency at which the magnetic pole position of the motor changes, and has an amplitude proportional to the salience ratio as described above. More specifically, an angular distribution of inductance doe not appear in a motor having no salience such as a surface magnet motor. Furthermore, an embedded permanent magnet motor has an angular distribution changing according to a salience ratio.

An ideal inductance distribution is sinusoidal unless a salience ratio is zero. However, various errors are superposed on an inductance value detected via an inverter circuit and a calculation unit. The errors include mechanical errors of a motor resulting from problems relating to manufacture, errors of a current detection section, errors due to wiring unbalance, errors due to operation accuracy of a calculation unit. That is, the detection of magnetic pole position becomes difficult in motors having smaller salience ratios since an S/N ratio for inductance detection is extremely low in these motors.

Figure 3:
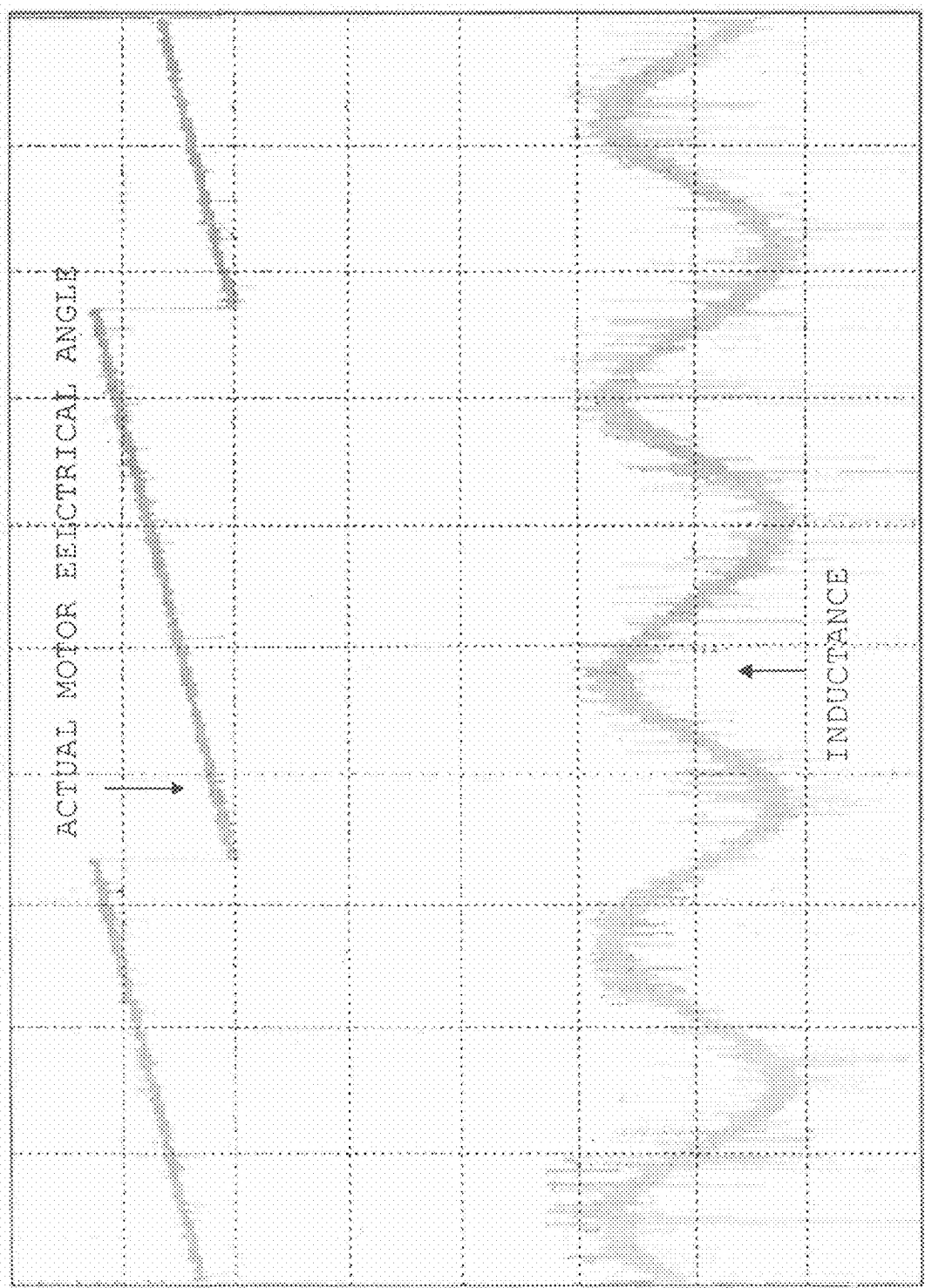
FIG. 3 is a graph showing an inductance distribution characteristic detected by a calculation unit regarding an electric motor having a salience ratio of 2.0.
Figure 4:
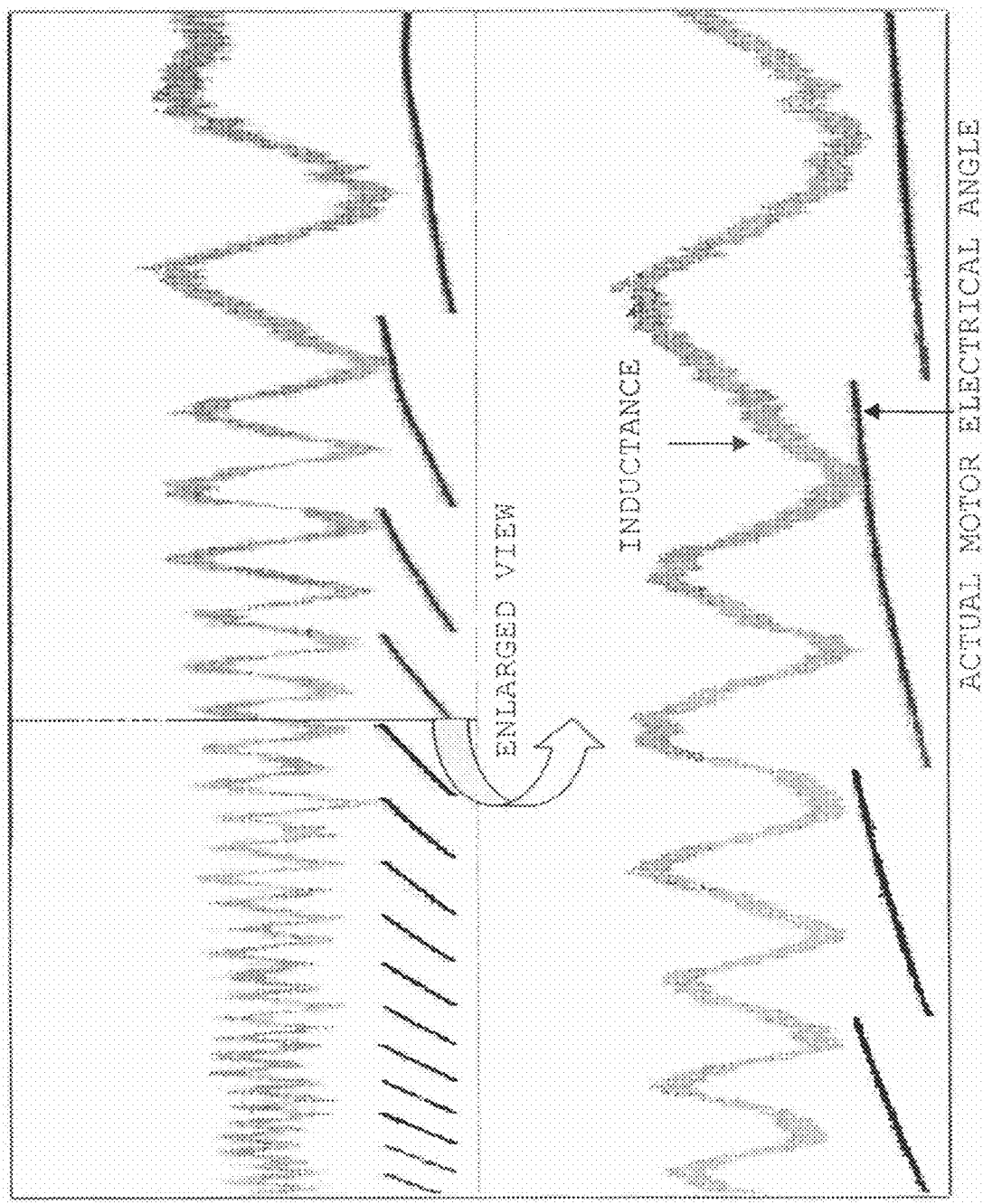
FIG. 4 is a view similar to FIG. 3, showing the case of an electric motor having a salience ratio of 1.09.
Figure 5:
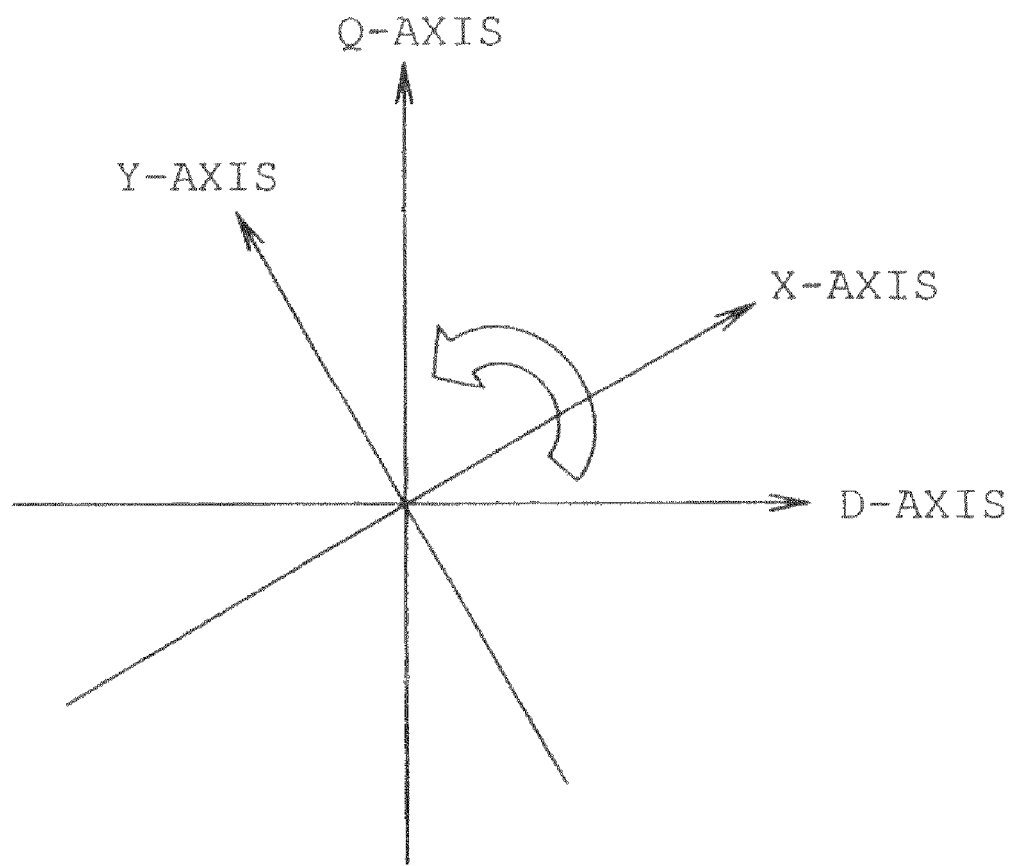
FIG. 5 shows x and y axes rotated at a frequency for observing changes in the inductance and d and q axes rotated at a frequency for controlling the motor.

FIGS. 3 and 4 show inductance distribution characteristics detected by a calculation unit in an electric motor having a salience ratio of 2.0 and an electric motor having a salience ratio of 1.09 (the motor 16, for example) respectively. FIG. 3 clearly shows a sinusoidal distribution characteristic although a sinusoidal characteristic is unclear in FIG. 4.

In the case where the motor magnetic pole position of the motor is estimated and detected using an angular distribution characteristic of inductance, the magnetic pole position has conventionally been detected by compensating for an estimated position and speed using a proportional-integral (PI) controller, for example, so that an inductance value obtained from current and voltage coordinate-converted by the use of an estimated position become zero. In this case, the inductance value becomes zero when the magnetic pole position has been detected. However, a sinusoidal distribution cannot be obtained in the motors having smaller salience ratios as described above since various noise components are superposed on an inductance value. Furthermore, the angle at which the inductance becomes zero differs depending upon conditions. Thus, it is difficult to estimate the magnetic pole position by conventional methods.

However, when focusing attention on time-dependent change characteristics but not on an amount of inductance, it can easily be confirmed that inductance contains frequency component that is twice as high as at the magnetic pole position of the motor although a sinusoidal distribution cannot be obtained. In the embodiment, accordingly, a condition is produced where time-dependent change response of the inductance is obtained while the magnetic pole position of the motor is being detected. Thus, the time-dependent changes in the inductance are processed using digital signals so that frequency and phase components are extracted, whereby a magnetic pole position of the motor 16 is detected.

The time-dependent change response of the inductance occurs when a frequency at which the motor is actually being rotated differs from a frequency at the measurement side. For example, FIGS. 3 and 4 show a case where a motor is rotated with zero frequency at the measurement side (the coordinate axis is not rotated). Accordingly, since the inductance is controlled so as to be at zero, the time-dependent change response of the inductance cannot be measured in the condition where a frequency at the measurement side become equal to a rotational frequency of the motor.

Figure 6:
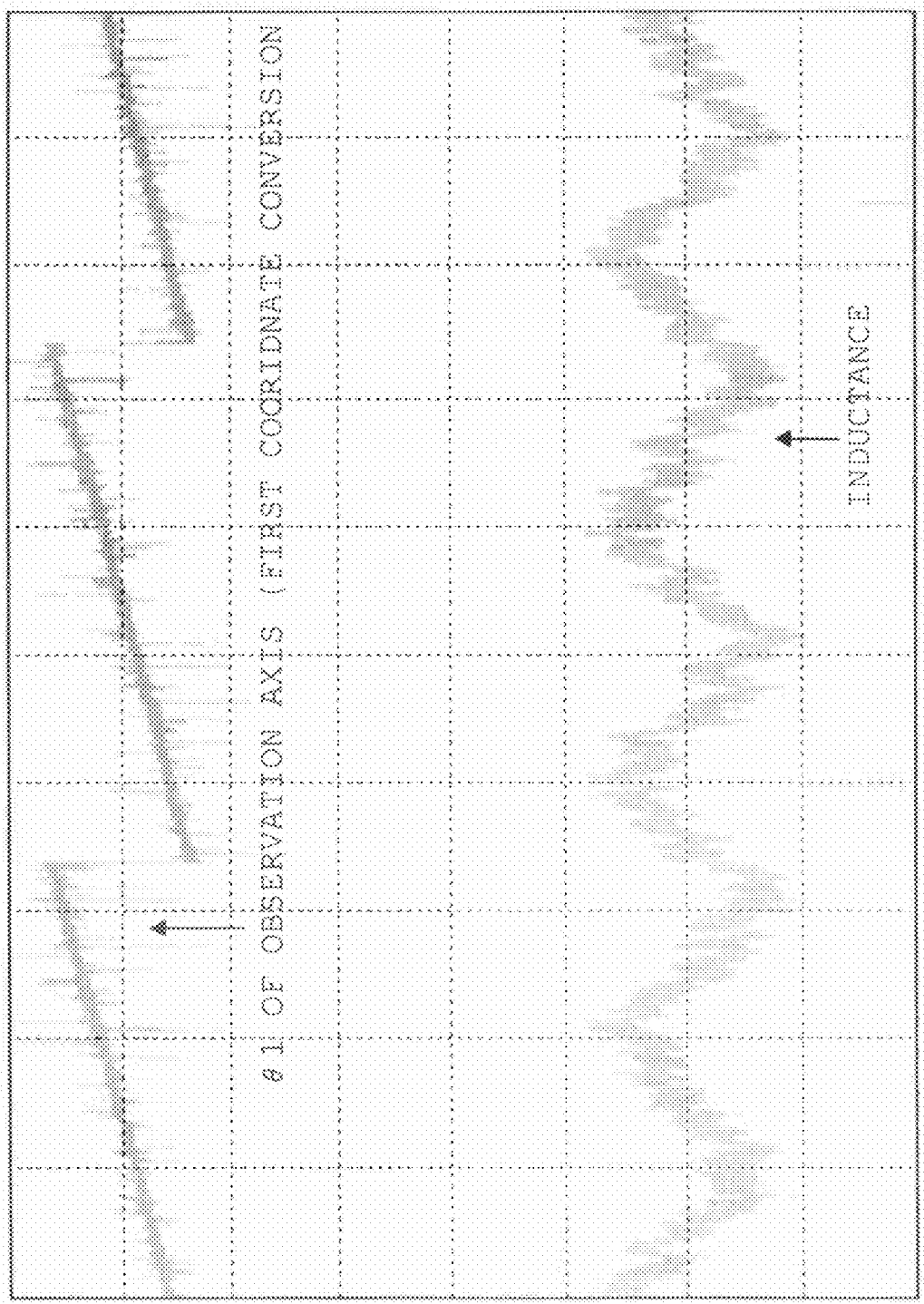
FIG. 6 is a graph showing an inductance value calculated while the motor rotation has been stopped.

In view of the above-described circumstances, the embodiment provides a coordinate axis having a measurement side frequency for measurement of the inductance change response (an X-Y axes: the first coordinate conversion section 44) and another coordinate axis rotated at a frequency for actual control of the motor (a d-q axes: the second coordinate conversion section 47), both of which are vector-controlled independently. More specifically, an observation axis (the first coordinate conversion section 44) is normally being rotated at a predetermined frequency. Accordingly, as shown in FIG. 6, for example, an inductance value calculated from current and voltage detected by the observation axis makes a time-dependent change response at a frequency according to the difference between the motor frequency and the observation axis frequency even while the motor rotation is stopped.

Figure 7B:
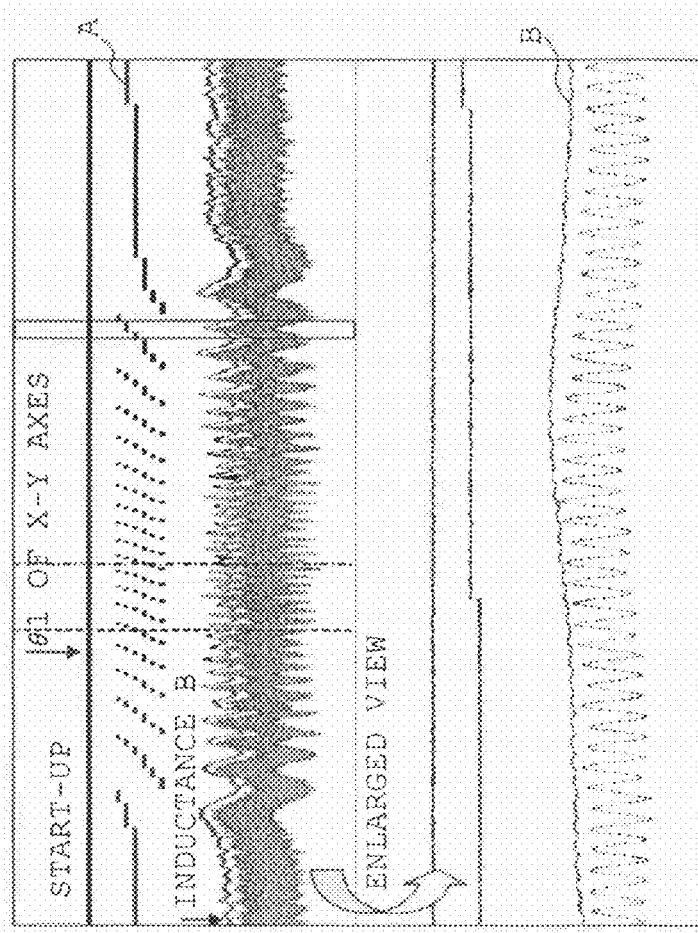
FIGS. 7A and 7B show an inductance value as viewed at an observation axis in the case where the motor with a salience ratio of 1.09 is rotated under the condition where the observation axis is set to the frequency of zero.
Figure 7A:
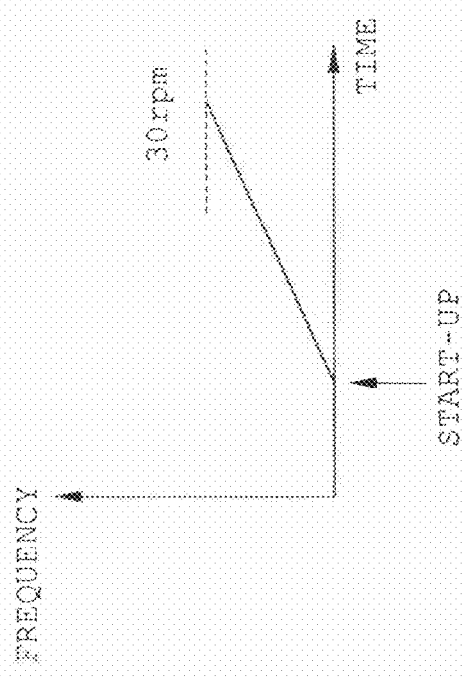

FIGS. 7A and 7B show an inductance value as viewed at the observation axis side in the case where the observation axis frequency is set to zero and the rotational speed of the motor with the salience ratio of 1.09 is increased from 0 to 30 rpm. FIG. 8B shows an inductance value as viewed at the observation axis side in the case where the observation axis is rotated at a constant frequency (40 rpm (solid line)) and the rotational speed of the motor is increased from 0 to 30 rpm. It is understood that a time-dependent change response of inductance in FIGS. 7A and 7B appears as the same frequency as the motor frequency whereas the same change response in FIGS. 8A and 8B appears as the difference between the motor frequency and the measurement frequency. More specifically, the change response frequency of inductance (dashed-dotted line) is reduced with increase in the rotational speed of the motor (broken line).

The aforesaid change response does not make a theoretical sinusoidal distribution as described above in a motor with a smaller salience ratio. However, the differential frequency component and a phase component thereof are present between the motor frequency and the observation axis frequency contained in the change response. Accordingly, the digital signal processing is carried out to extract the frequency and phase components as will be described later.

Figure 11:
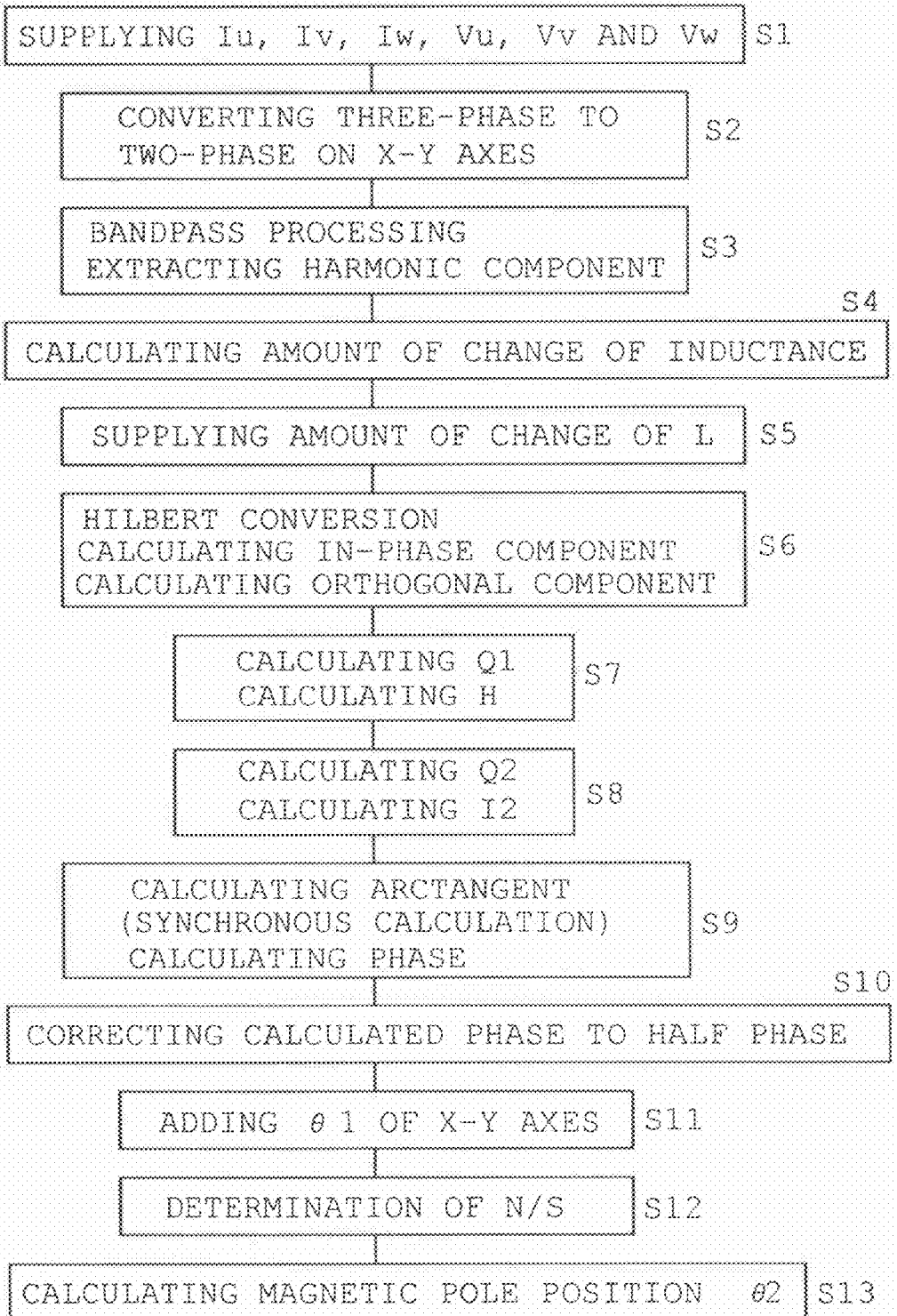
FIG. 11 is a flowchart showing the processing by the control device.
Figure 12:
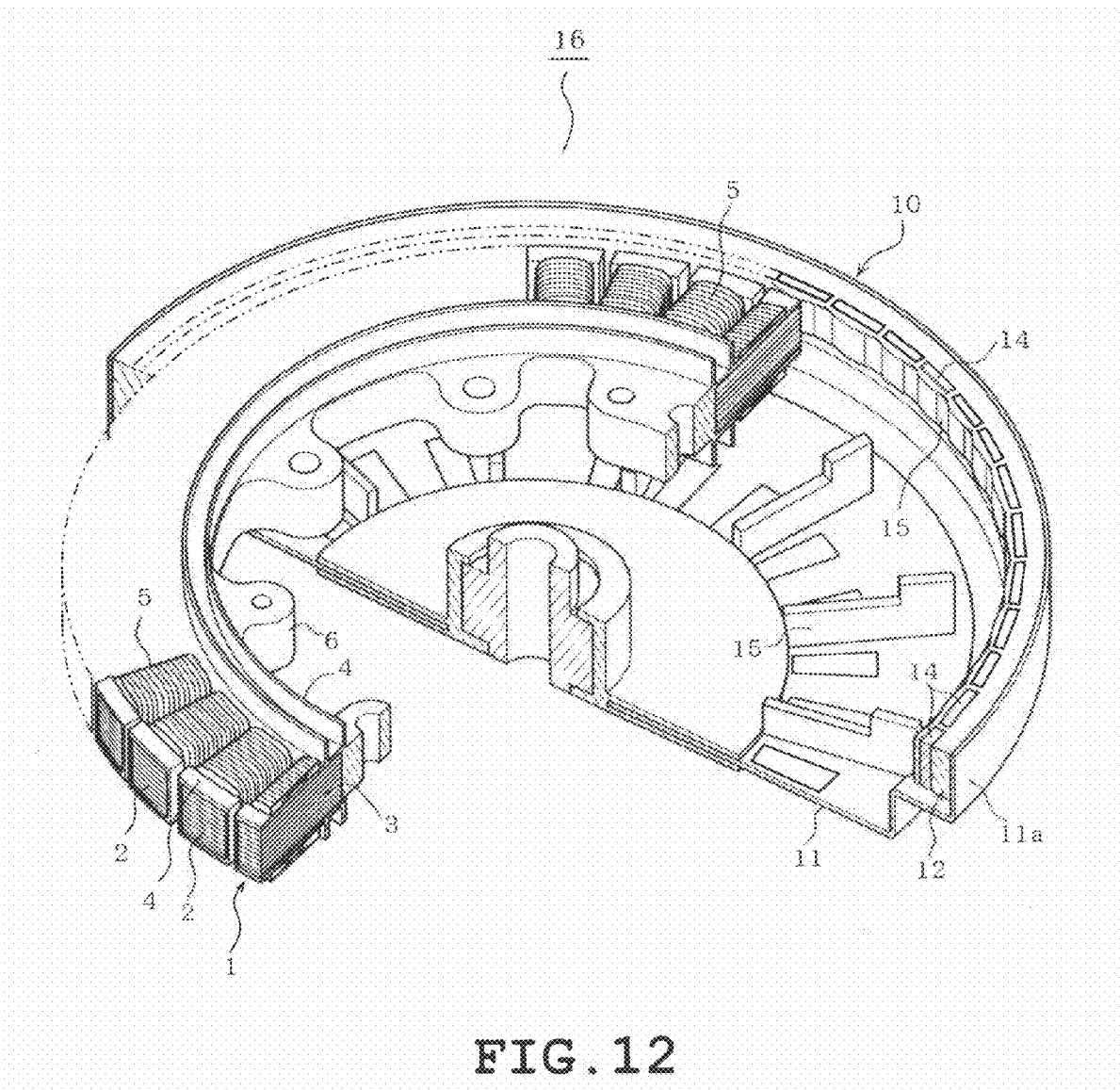
FIG. 12 is a partially broken perspective view of a permanent magnet motor.

Referring now to FIG. 11, the processing by the motor control device 41 is shown. An inductance obtained by the inductance calculation section 56 and the result is supplied to the magnetic pole position detection section 48. The processing from the obtainment of the inductance to the supply thereof to the magnetic pole position detection section 48 corresponds to steps S1 to S5.

There have been known various manners of extracting the frequency and phase components from the time-dependent inductance component. A method using a Hilbert transformer will be described as one example as follows. An orthogonal component leading 90° in phase relative to an analytical signal as an input can be calculated when the Hilbert transformer is used. Here, the Hilbert transformer is composed of a sixth-order finite impulse response (FIR) filter as shown by equation (2). Delay in response can be suppressed to a certain degree by cutting off the FIR filter at the sixth-order. Furthermore, the order of a median in filter calculation corresponds to a third-order.

$$Lh=\alpha1 \cdot L(0)+\alpha2 \cdot L(2)-\alpha2 \cdot L(4)-\alpha1 \cdot L(6) \quad (2)$$

where L(0) is a present analytical signal (an inductance value), L(2) is an analytical signal before two control cycles, L(4) is an analytical signal before four control cycles, L(6) is an analytical signal before six control cycles, Lh is a Hilbert conversion output, and α1 and α2 are filter constants.

However, the FIR filter attenuates a frequency component of an analytical signal. In view of this, an amplitude compensation is carried out using a previous value of period P of an inductance value to be obtained later (discrete arithmetic schemes are used). A case where a change cycle of inductance value differs from a previous one before one control cycle to a large extent is rare during low-speed rotation of a motor. Accordingly, an amount of calculation error is small even when a previous value of the cycle is used. The following equation (3) shows a constitutive equation of Hilbert transformer including amplitude compensation:

$$Lh=\{\alpha1 \cdot L(0)+\alpha2 \cdot L(2)-\alpha2 \cdot L(4)-\alpha1 \cdot L(6)\} \times \{\alpha3 \cdot P(1)+\alpha4\} \quad (3)$$

where P(1) is an inductance cycle before one control cycle and α3 and α4 are amplitude compensation constants.

Figure 9:
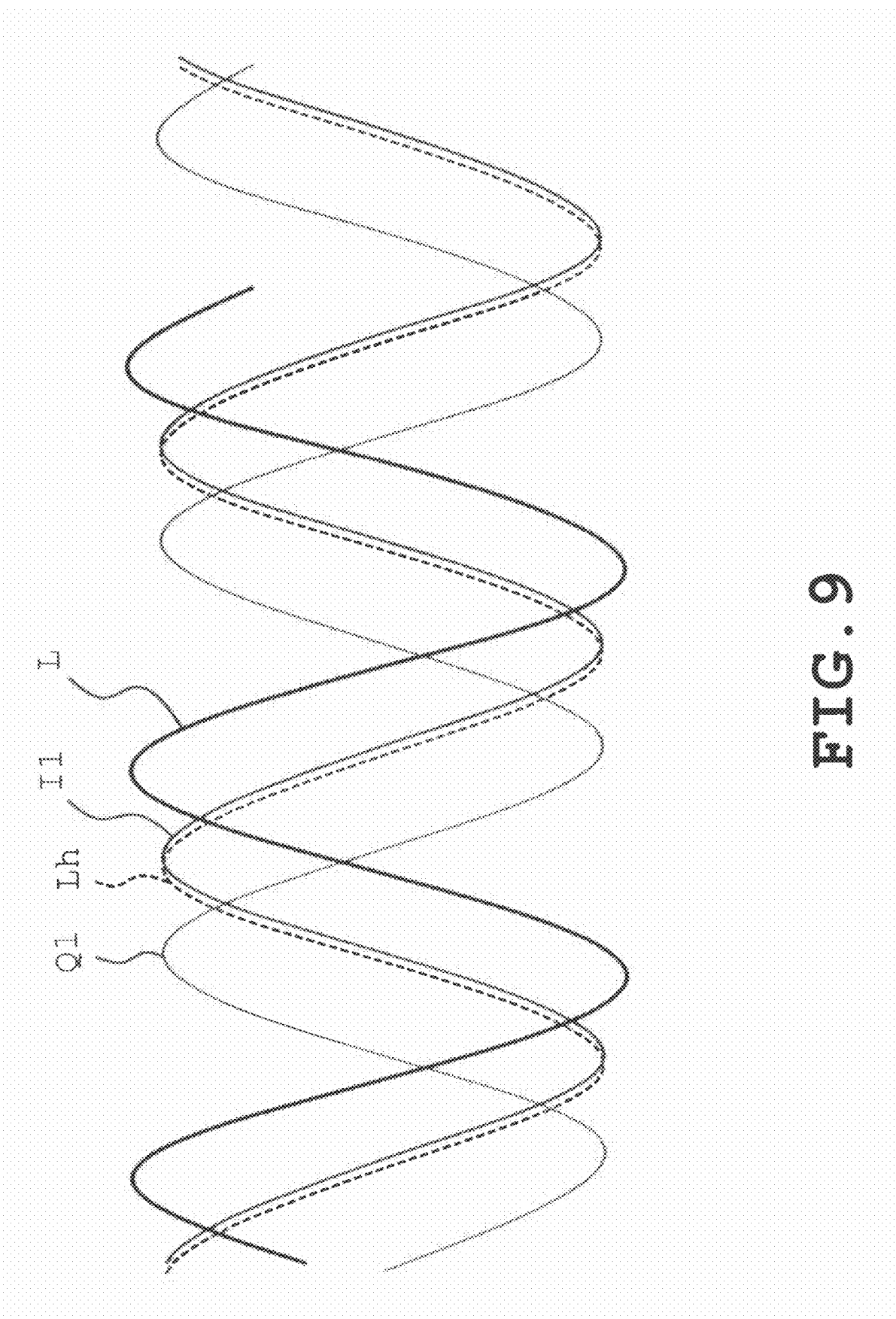
FIG. 9 shows various signal waveforms obtained by an inductance value serving as an analytical signal and other operation.

FIG. 9 shows various signals including an inductance value serving as an analytical signal. Reference symbol "Lh" designates a value obtained by passing an inductance composition through a Hilbert transformer using equation (3). The value Lh is further passed through the Hilbert transformer so that an orthogonal component Q1 with a phase leading 90° relative to the value Lh. A signal of the value Lh before three control cycles is referred to as an in-phase component I1 (step S7). Here, the selection of signal before three control cycles corresponds to a median having a third order in a sixth-order filter arithmetic method.

These components Q1 and I1 are further Hilbert-transformed into jI and jQ respectively, and I2 and Q2 are calculated from I1, Q1, j1 and jQ (step S8):

$$Q1=\{\alpha1 \cdot Lh(0)+\alpha2 \cdot Lh(2)-\alpha2 \cdot Lh(4)-\alpha1 \cdot Lh(6)\}1 \times \{\alpha3 \cdot P(1)+\alpha4\} \quad (4)$$

$$I1=Lh(3) \quad (5)$$

$$jI=\{\alpha1 \cdot I1(0)+\alpha2 \cdot I1(2)-\alpha2 \cdot I1(4)-1 \cdot I1(6)\} \times \{\alpha3 \cdot P(1)+\alpha4\} \quad (6)$$

$$jQ=\{\alpha1 \cdot Q1(0)+\alpha2 \cdot Q1(2)-\alpha2 \cdot Q1(4)-\alpha1 \cdot Q1(6)\} \times \{\alpha3 \cdot P(1)+\alpha4\} \quad (7)$$

$$I2=I1-jQ \quad (8)$$

$$Q2=Q1-jI \quad (9)$$

where I1 is an in-phase component, Q1 is an orthogonal component, is a complex-averaged in-phase component, and Q2 is a complex-averaged orthogonal component.

A complex square sum of analytical signal I2 and orthogonal signal Q2 is obtained by the following equations (10) and (11):

$$Re=I2^2+Q2^2 \quad (10)$$

$$Im=I2 \cdot jQ-Q2 \cdot I2 \quad (11)$$

where Re is a real number component and Im is an imaginary number.

A period P of the inductance value is obtained by the following equation (12) using the obtained real and imaginary numbers Re and Im. The period P is used for amplitude compensation of the above-described Hilbert transformer:

$$P=360/\{\arctan(Im/Re)\} \quad (12)$$

Furthermore, arctangent values of the in-phase component I1 and the orthogonal component obtained during calculation of the period P by the use of equation (13), and a phase angle θL1 of the inductance value is obtained (step S9):

$$\theta L1=\arctan(Q1/I1) \quad (13)$$

The obtained phase angle θL1 changes at a frequency that is twice as high as the difference between the motor frequency and the observation shaft frequency. Accordingly, the phase angle θL1 is corrected into a phase angle θL2 so as to have a half frequency (step S10). The phase angle θL2 is a differential phase between the motor frequency and the observation frequency. Accordingly, when the phase θ1 corresponding to a frequency of the observation axes (x- and y-axes) is added to the phase angle θL2, a magnetic pole position θ' corresponding to the motor frequency is obtained (step S11). However, the magnetic pole position θ' contains a 180-degree error since the magnetic pole position θ' is obtained from a distribution characteristic of the inductance, that is, the frequency component that is twice as high as the motor angular distribution. More specifically, there is a case where the current magnetic pole position is inverted with respect to the north and south pole sides of the magnet.

Figure 10:
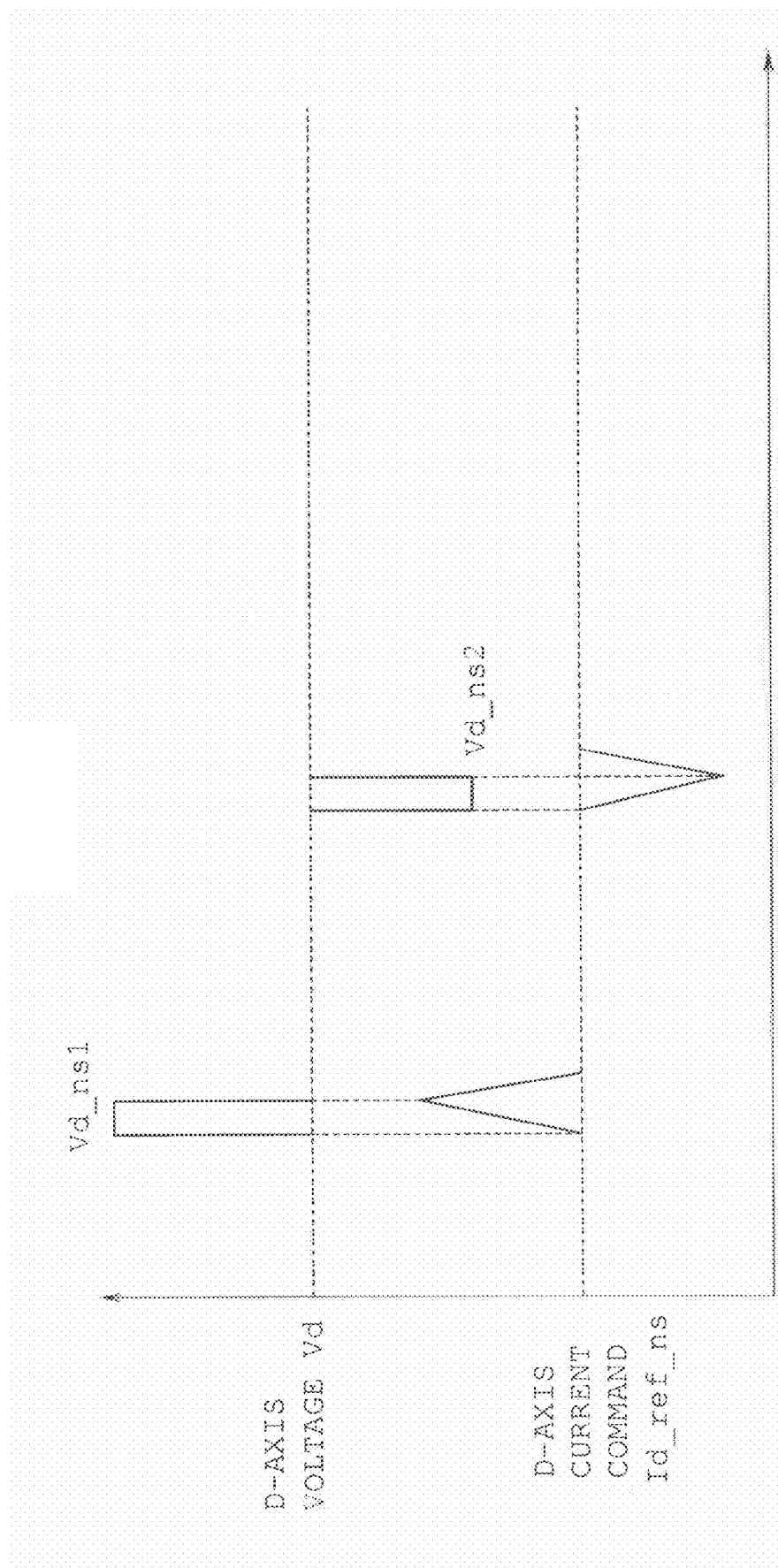
FIG. 10 shows an N/S pole determination process to determine whether the magnetic pole position θ' should be corrected.

The above-mentioned error is eliminated by a method as shown in FIG. 10. The second current control section 51 uses the second coordinate conversion section 47 which further uses the calculated magnetic pole position θ'. A pulsed d-axis current command +Id_ref_ns for N/S pole determination is supplied to the second current control section 51. A d-axis voltage Vd_ns1 generated in this case is detected. Subsequently, a negative d-axis current command −Id_ref_ns is supplied to the second current control section 51, and a d-axis voltage Vd_ns2 is detected. An amount of correction of the magnetic pole position is determined based on the level of d-axis voltage (step S12).

For example, when Vd_ns1>Vd_ns2, a true magnetic pole position θ2 is equal to (θ'+180°. When Vd_ns1<Vd_ns2, no correction is necessitated and a true magnetic pole position θ2 is θ' (step S13). Furthermore, a motor frequency ω1 is obtained by differentiating the magnetic pole position θ2. Although a current command is supplied for detection of voltage in the above-described determination, a voltage command may be supplied for detection of current. Furthermore, although the determination is carried out by a single time of supply of pulsed command in the foregoing determination, the determination may be made on the basis of an average value of the detection results in the case of a plurality of times of command supply.

The switching section 60 selects the magnetic pole position θ2 and the motor frequency ω1 both supplied from the magnetic pole position detection section 48 when the rotational frequency ω1 of the motor 16 is less than a threshold at which an induced voltage is detectable. As a result, the switching section 60 delivers the selected values as the magnetic pole position θ and the motor frequency ω. The above-mentioned threshold differs depending upon motor characteristics or the like, and for example, the threshold is assumed to be about 2 to 3% of the maximum operation frequency of the motor. When the rotational frequency ω1 is not less than the threshold, the magnetic pole position estimation section 49 can execute the estimation of magnetic pole position with the use of an induced voltage. Accordingly, the switching section 60 is switched so that the magnetic pole position θ3 and the frequency ω2 both estimated by the magnetic pole position estimation section 49 are selected, whereby a magnetic pole position and frequency both providing a higher resolution performance are obtained.

Furthermore, when the rotational frequency of the motor 16 is reduced such that the magnetic pole position θ3 and the frequency θ2 both estimated by the estimation section 49 need to be changed to the magnetic pole position detection section 48, the estimation by the estimation section 49 and the detection by the detection section 48 are simultaneously carried out temporarily. The correction by 180° for the magnetic pole position θ' detected by the detection section 48 is carried out by comparing the magnetic pole position θ3 estimated by the estimation section 49 and the magnetic pole position θ2 detected by the detection section 48. For example, a correction by +180° is carried out when the detected magnetic pole position θ2 differs from the estimated magnetic pole position θ3 by 180°. No correction is carried out when both agree with each other.

According to the foregoing embodiment, the AC current application section 45 of the motor control device 41 generates the AC current commands Idx_ref and Iqy_ref to detect a magnetic pole position of the motor 16 having a magnetic saliency. The first coordinate conversion section 44 vector-converts motor currents Iu, Iv and Iw to the excitation component Idx and the torque component Iqy both represented by the d-q orthogonal coordinate system, based on the phase angle θ1 supplied thereto from the magnetic pole detection section 48. The inductance calculation section 56 calculates the inductance L of the motor 16 based on the voltage commands Vdx and Vqy delivered by the current control section 46, the d-axis current Idx and the q-axis current Iqy. The magnetic pole detection section 48 calculates the frequency and the phase θL2 of the inductance L and then converts the phase θL2 to the magnetic pole position θ2 of the motor 16.

More specifically, the motor control device 41 is provided with the x-y coordinate axes at the first coordinate conversion section 44 side and the d-q coordinate axes at the second coordinate conversion section 47 side. The first coordinate conversion section 44 has the observation side frequency provided for observation of change and response of the inductance L. The second coordinate conversion section 47 provides the frequency actually used to control the motor 16. These two coordinate systems are vector-controlled individually. As a result, the magnetic pole position can successfully be detected by the use of the magnetic saliency even when the S/N ratio of the magnetic pole position information contained in the detected inductance is lower in the motor 16 having a smaller salience ratio or the motor in which the occurrence of magnetic saturation has reduced the salience ratio. Furthermore, since the motor control device 41 controls the permanent magnet motor without a position sensor for detecting the magnetic pole position, the motor control device 41 can be rendered smaller in size and manufactured at lower costs. Additionally, the maintenance performance can be improved.

Furthermore, the first coordinate conversion section 44 is set to the coordinate system which rotates the motor 16 at the frequency obtained by adding the predetermined frequency ω0 to the rotational frequency ω1 of the motor 16 detected by the magnetic pole position detection section 48. Consequently, the inductance of the motor 16 can reliably be calculated since the frequencies of the conversion section 44 and the detection section 48 normally take different values. The inductance calculation section 56 obtains the inductance L observed as having the frequency that is twice as high as the frequency at which the magnetic pole position of the motor 16 changes. Consequently, the phase θ2 of the motor 16 can easily be obtained based on the inductance phase θL2.

The magnetic pole position detection section 48 detects the magnetic pole position θ2 of the motor 16 by adding the phase θ1 of the rotating coordinate system in the first coordinate conversion section 44 to the phase θL2 of the inductance calculated by the inductance calculation section 56. Thus, the phase component of the coordinate having been rotated for the calculation of inductance can be compensated for, whereupon a precise magnetic pole location θ2 can be obtained.

The magnetic pole position estimation section 49 is provided for estimating the magnetic pole position of the motor 16 based on the d-axis current Id and the q-axis current Iq both delivered by the second coordinate conversion section 47. The second coordinate conversion section 47 carries out the vector conversion based on either detected magnetic pole position θ2 or estimated magnetic pole position θ3 both of which are supplied via the switching section 60. Consequently, when the former is selected in a low-speed region of the motor 16 and the latter is selected in a high-speed region, the vector control can be carried out while the magnetic pole position θ and the frequency ω are suitably obtained according to a rotational speed of the motor 16.

When the pulsed positive and negative d-axis currents +Id_ref_ns and −Id_ref_ns are applied to the motor 16 by the second current control section 51, the magnetic pole position detection section 48 determines whether the current magnetic pole position is N or S, based on the resultant detected d-axis voltages Vd_ns1 and Vd_ns2. The magnetic pole position detection section 48 determines whether a 180° correction should be carried out or not with respect to the detected magnetic pole position θ', according to the result of the aforesaid determination, during stop of rotation of the motor 16.

More specifically, the magnetic pole position θ' contains error by 180° since the position θ' is obtained from the inductance L with the frequency that is twice as high as the angular distribution of the motor 16. Accordingly, the precise magnetic pole position θ2 can be obtained when the magnetic pole position θ' is corrected in the manner as described above, as occasion arises.

When the rotational frequency of the motor 16 becomes less than the threshold, the magnetic pole position detection section 48 compares the detected magnetic pole position θ' with the magnetic pole position θ3 estimated by the magnetic pole position estimation section 49 thereby to determine whether the 180-degree correction should be carried out. Consequently, the determination can easily be made about necessity of correction.

The drum washing-drying machine 21 is arranged so that the motor control device 41 vector-controls the motor 16 via the inverter circuit 42 to rotate the drum 27 for a washing operation or the like. Consequently, the magnetic pole position θ of the motor 16 can be detected for execution of the vector control without provision of a position sensor, whereupon a washing-drying machine manufactured at lower costs and having a higher performance can be provided.

Figure 14:
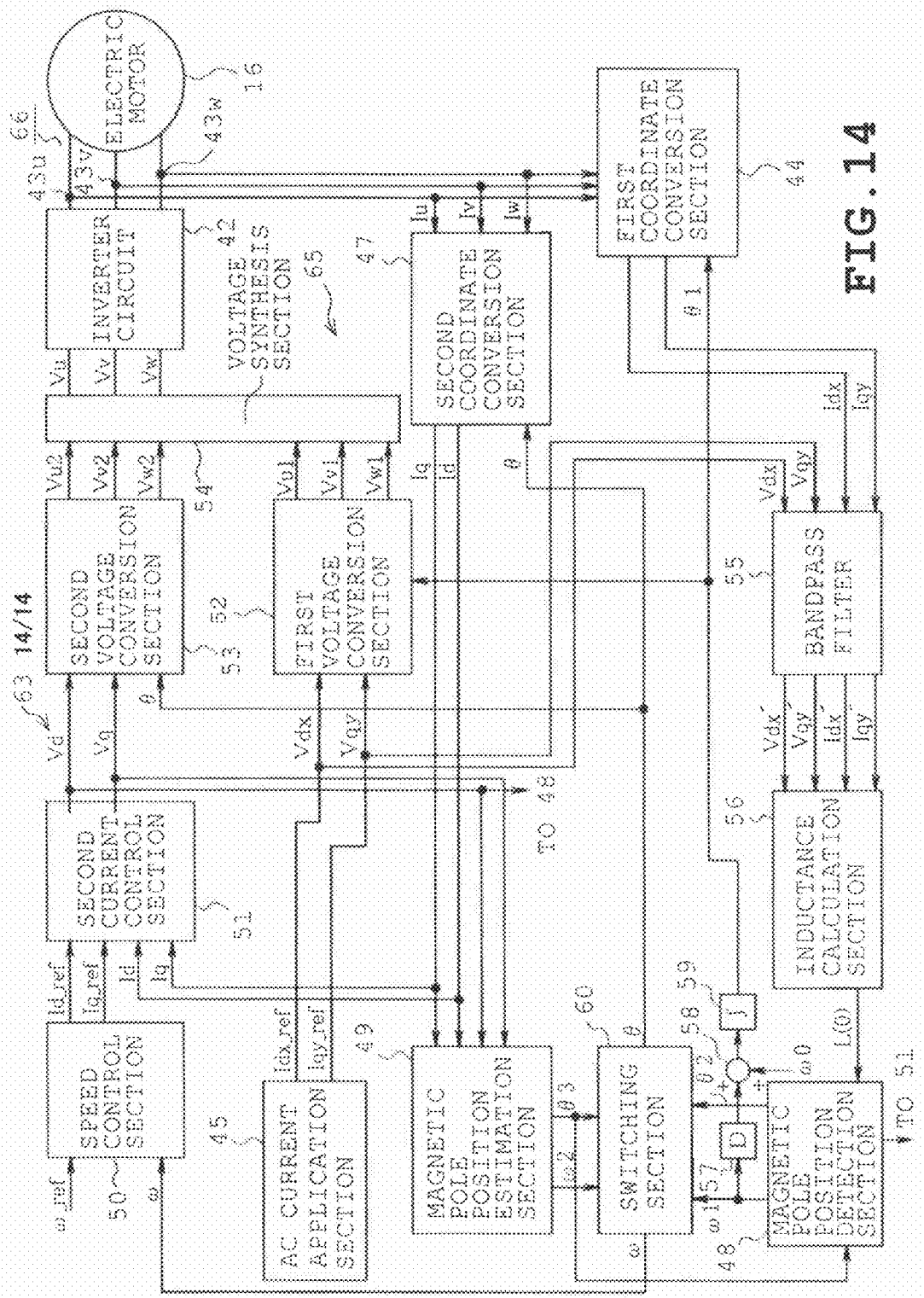
FIG. 14 is a view similar to FIG. 1, showing an electrical arrangement of the control device in which the motor magnetic pole position detecting device in accordance with a second embodiment of the invention is incorporated.

FIG. 14 illustrates a second embodiment. Identical or similar parts in the second embodiment are labeled by the same reference symbols as those in the first embodiment. Only the difference between the embodiments will be described. The motor control device 64 in accordance with the second embodiment is provided with an AC voltage application section (a detection voltage command generating unit) 64 which delivers an AC voltage commands Vdx_ref and Vqy_ref for detection of magnetic pole position, instead of the Ac current application section 45. These voltage commands Vdx_ref and Vqy_ref substitute for Idx_ref and Iqy_ref. The first current control section 46 is eliminated, and the aforesaid voltage commands Vdx_ref and Vqy_ref are delivered directly to the first voltage conversion section 52. The other arrangement of the second embodiment is the same as that in the first embodiment.

In the above-described arrangement, the motor control device 63 except for the inverter circuit 42 constitutes a motor magnetic pole position detecting device 65. Furthermore, the motor control device 63 added with the motor 16 constitutes a motor drive system 66.

According to the second embodiment, the motor control device 63 can further be arranged more easily since the first current control section 46 is de-necessitated.

The foregoing embodiments are not restrictive but and may be modified or expanded as follows. All three-phase currents need not be detected. Only two-phase currents may be detected and the other phase current may be obtained by calculation, instead.

The phase angle θ1 supplied to the first coordinate conversion section 44 may not be set based on the motor frequency col. The phase angle may be based on a frequency differing from a rotational frequency of the motor 16. Furthermore, when the motor 16 is being rotated, the rotation of observation coordinate system may be stopped without supply of the phase angle θ1.

The arrangement only estimating the magnetic pole position of the motor de-necessitates the second coordinate conversion section 47, magnetic pole position estimation section 49, speed control section 50, second current control section 51, second voltage conversion section 53 and voltage control section 59.

The motor control device may be applied to a permanent magnet motor of the inner rotor type in which a rotor is located inside a stator of the motor, instead. Furthermore, the motor control device may be applied to washing machines without a drying function. Additionally, the motor control device may be applied to various apparatus, devices and equipment each of which uses a permanent magnet motor with the magnetic saliency, instead of the washing-drying machines and washing machines.

The foregoing description and drawings are merely illustrative of the principles and are not to be construed in a limiting sense. Various changes and modifications will become apparent to those of ordinary skill in the art. All such changes and modifications are seen to fall within the scope as defined by the appended claims.

What is claimed is:

1. A motor magnetic pole position detecting device which detects a magnetic pole position of a permanent magnet motor having a magnetic saliency, the device comprising:
   a detection current command generation unit which generates a detection AC current command for detection of the magnetic pole position;
   a current detection section which detects a current flowing into the motor;
   a coordinate conversion unit which vector-converts the current detected by the current detection section into an excitation component and a torque component both represented by a d-q orthogonal coordinate system based on a phase angle obtained at any rotational frequency;
   a current control unit which generates and delivers a voltage command to current-control the motor based on the detection current command and the current converted by the coordinate conversion unit;
   an inductance calculation unit which calculates an inductance of the motor based on the voltage command and the current converted by the coordinate conversion unit; and
   a magnetic pole position detection section which calculates a frequency and phase of the inductance calculated by the inductance calculation unit, thereby converting the phase of the inductance into a magnetic pole position of the motor.

2. The motor magnetic pole position detecting device according to claim 1, further comprising a frequency detection section which detects a rotational frequency of the motor, wherein the coordinate conversion unit is set to a coordinate system rotated at a frequency obtained by adding a predetermined frequency to a rotational frequency of the motor.

3. The motor magnetic pole position detecting device according to claim 1, wherein the inductance calculation unit calculates an inductance observed at a frequency which is twice as high as a frequency in a case where a magnetic pole position of the motor changes.

4. The motor magnetic pole position detecting device according to claim 1, wherein the magnetic pole position detection section detects the magnetic pole position by adding a phase of a rotational coordinate system to a phase of the inductance obtained by the inductance calculation unit.

5. The motor magnetic pole position detecting device according to claim 1, wherein the coordinate conversion unit serves as a first coordinate conversion unit, the device further comprising:
   a second coordinate conversion unit which vector-converts the current detected by the current detection section into an excitation component and a torque component both represented by a d-q orthogonal coordinate system based on a magnetic pole position obtained by the magnetic pole position detection section;
   a speed control unit which generates and delivers a speed-control current command based on a speed command of the motor externally supplied thereto;
   wherein the current control unit which generates and delivers a voltage command to current-control the motor is based on the speed control current command and the current converted by the second coordinate conversion unit;
   a magnetic pole position estimation unit which estimates the magnetic pole position and a rotational frequency of the motor using the voltage command, the current converted by the second coordinate conversion unit and a constant of the motor,
   wherein the second coordinate conversion unit is arranged so as to vector-convert the current flowing into the motor based even on a magnetic pole position obtained by the magnetic pole position estimation unit;
   the second coordinate conversion unit executes the conversion using the magnetic pole position detected by the magnetic pole position detection section when a rotational frequency of the motor is less than a threshold at which an induced voltage of the motor is detectable; and
   the second coordinate conversion unit executes the conversion using the magnetic pole position estimated by the magnetic pole position estimation unit when the rotational frequency of the motor is not less than the threshold.

6. The motor magnetic pole position detecting device according to claim 5, wherein when a pulsed positive or negative d-axis voltage or d-axis current is applied to the motor in a d-q orthogonal coordinate system of the second coordinate conversion unit, the magnetic pole position detection section determines whether a current magnetic pole position based on a resultant d-axis current or voltage to be detected is a north magnetic pole or a south magnetic pole, and when the motor rotation has stopped, the magnetic pole position detection section determines whether a 180-degree correction should be carried out with respect to a magnetic pole position detected according to the result of determination.

7. The motor magnetic pole position detecting device according to claim 5, wherein when the rotational frequency of the motor is less than the threshold, the magnetic pole position detection section compares the magnetic pole position detected thereby with the magnetic pole position estimated by the magnetic pole position estimation unit, thereby determining whether a 180-degree correction should be carried out with respect to a magnetic pole position detected by the magnetic pole position detection section.

8. A motor magnetic pole position detecting device which detects a magnetic pole position of a permanent magnet motor having a magnetic saliency, the device comprising:
   a detection voltage command generation unit which generates a detection AC voltage command for detection of the magnetic pole position;
   a current detection section which detects a current flowing into the motor;
   a coordinate conversion unit which vector-converts the current detected by the current detection section into an excitation component and a torque component both represented by a d-q orthogonal coordinate system based on a phase angle obtained at any rotational frequency;
   an inductance calculation unit which calculates an inductance of the motor based on the voltage command and the current converted by the coordinate conversion unit; and
   a magnetic pole position detection section which calculates a frequency and phase of the inductance calculated by the inductance calculation unit, thereby converting the phase of the inductance into a magnetic pole position of the motor.

9. The motor magnetic pole position detecting device according to claim 8, further comprising a frequency detection section which detects a rotational frequency of the motor, wherein the coordinate conversion unit is set to a coordinate system rotated at a frequency obtained by adding a predetermined frequency to a rotational frequency of the motor.

10. The motor magnetic pole position detecting device according to claim 8, wherein the inductance calculation unit calculates an inductance observed at a frequency which is twice as high as a frequency in a case where a magnetic pole position of the motor changes.

11. The motor magnetic pole position detecting device according to claim 8, wherein the magnetic pole position detection section detects the magnetic pole position by adding a phase of a rotational coordinate system to a phase of the inductance obtained by the inductance calculation unit.

12. The motor magnetic pole position detecting device according to claim 8, wherein the coordinate conversion unit serves as a first coordinate conversion unit, the device further comprising:
   a second coordinate conversion unit which vector-converts the current detected by the current detection section unit into an excitation component and a torque component both represented by a d-q orthogonal coordinate system based on a magnetic pole position obtained by the magnetic pole position detection section;
   a speed control unit which generates and delivers a speed-control current command based on a speed command of the motor externally supplied thereto;
   a current control unit which generates and delivers a voltage command to current-control the motor based on the speed control current command and the current converted by the second coordinate conversion unit;
   a magnetic pole position estimation unit which estimates the magnetic pole position and a rotational frequency of the motor using the voltage command, the current converted by the second coordinate conversion unit and a constant of the motor,
   wherein the second coordinate conversion unit is arranged so as to vector-convert the current flowing into the motor based even on a magnetic pole position obtained by the magnetic pole position estimation unit;
   the second coordinate conversion unit executes the conversion using the magnetic pole position detected by the magnetic pole position detection section when a rotational frequency of the motor is less than a threshold at which an induced voltage of the motor is detectable; and
   the second coordinate conversion unit executes the conversion using the magnetic pole position estimated by the magnetic pole position estimation unit when the rotational frequency of the motor is not less than the threshold.

13. The motor magnetic pole position detecting device according to claim 12, wherein when a pulsed positive or negative d-axis voltage or d-axis current is applied to the motor in a d-q orthogonal coordinate system of the second coordinate conversion unit, the magnetic pole position detection section determines whether a current magnetic pole position based on a resultant d-axis current or voltage to be detected is a north magnetic pole or a south magnetic pole, and when the motor rotation has stopped, the magnetic pole position detection section determines whether a 180-degree correction should be carried out with respect to a magnetic pole position detected according to the result of determination.

14. The motor magnetic pole position detecting device according to claim 12, wherein when the rotational frequency of the motor is less than the threshold, the magnetic pole position detection section compares the magnetic pole position detected thereby with the magnetic pole position estimated by the magnetic pole position estimation unit, thereby determining whether a 180-degree correction should be carried out with respect to a magnetic pole position detected by the magnetic pole position detection section.

* * * * *